(12) United States Patent
Cairns

(10) Patent No.: US 6,626,983 B1
(45) Date of Patent: Sep. 30, 2003

(54) METHOD AND APPARATUS FOR REMOVING PARTICULATES

(75) Inventor: James Anthony Cairns, Dundee (GB)

(73) Assignee: University Court of the University of Dundee (GB)

( * ) Notice: Subject to any disclaimer, the term of this patent is extended or adjusted under 35 U.S.C. 154(b) by 0 days.

(21) Appl. No.: 09/856,968

(22) PCT Filed: Nov. 25, 1999

(86) PCT No.: PCT/GB99/03930

§ 371 (c)(1),
(2), (4) Date: Jun. 21, 2001

(87) PCT Pub. No.: WO00/30734

PCT Pub. Date: Jun. 2, 2000

(30) Foreign Application Priority Data

Nov. 25, 1998 (GB) .............................. 9825812

(51) Int. Cl.⁷ .............................. B01D 47/02
(52) U.S. Cl. .............. 95/226; 96/333; 96/335; 96/336; 96/340; 96/343
(58) Field of Search .............. 95/226; 96/333, 96/337, 338, 339, 340, 342, 343, 344, 345, 334, 335, 336

(56) References Cited

U.S. PATENT DOCUMENTS

| 915,000 | A | * | 3/1909 | Walter et al. |
|---|---|---|---|---|
| 1,876,465 | A | * | 9/1932 | Misner |
| 1,994,766 | A | * | 3/1935 | Heglar |
| 2,250,226 | A | * | 7/1941 | Juelson |
| 2,405,494 | A | * | 8/1946 | Dupuy |
| 2,966,958 | A | * | 1/1961 | Sexton |
| 3,803,813 | A | * | 4/1974 | Yuzawa |
| 3,957,466 | A |   | 5/1976 | Coppola |
| 3,957,467 | A | * | 5/1976 | Kim |
| 4,005,999 | A |   | 2/1977 | Carlson |
| 4,350,505 | A | * | 9/1982 | Mallory et al. |
| 4,657,566 | A | * | 4/1987 | Wintering et al. |
| 4,834,836 | A | * | 5/1989 | Wemhoff |
| 4,851,016 | A | * | 7/1989 | Rylander |
| 5,129,926 | A | * | 7/1992 | Harwell |
| 5,397,381 | A |   | 3/1995 | Keintzel et al. |
| 5,453,107 | A | * | 9/1995 | Liu |
| 5,660,616 | A | * | 8/1997 | Choi et al. |
| 5,669,946 | A | * | 9/1997 | Blair, Jr. |
| 5,820,657 | A | * | 10/1998 | Driker et al. |
| 6,210,468 | B1 | * | 4/2001 | Carson |

FOREIGN PATENT DOCUMENTS

| FR | 2684022 | 5/1993 |
|---|---|---|
| GB | 756405 | 7/1954 |
| GB | 2258623 A | 2/1993 |
| JP | 07000740 | 1/1995 |

OTHER PUBLICATIONS

International Search Report corresponding to PCT/GB99/03930 completed 10, 2000.

* cited by examiner

Primary Examiner—Duane S. Smith
(74) Attorney, Agent, or Firm—Myers Bigel Sibley & Sajovec, P.A.

(57) ABSTRACT

An apparatus for removing particles and/or other undesirable components from a gas stream includes a container containing a liquid, an inlet for the gas stream permitting wetting of at least a portion of the gas stream, and an outlet from the container for cleaned gas. The inlet and/or the outlet includes condensing means for cooling desired fractions of the gas stream and/or cleaned gas. The liquid may be such as to wet the particulates, thereby retaining them in the liquid while the gas passes through the liquid to the outlet. Methods for removing particulates and/or other undesirable components from a gas stream are also provided.

36 Claims, 2 Drawing Sheets

METHOD AND APPARATUS FOR REMOVING PARTICULATES

CROSS-REFERENCE TO RELATED APPLICATIONS

The present application is a U.S. national phase application of PCT International Application No. PCT/GB99/03930, having an international filing date of Nov. 25, 1999 and claiming priority to Great Britain Application No. 9825812.2 filed Nov. 25, 1998. The above PCT International Application was published in the English language and has International Publication No. WO 00/30734.

This invention relates to a method and apparatus for removing particulates and/or other undesirable components. In particular the invention concerns such a method and apparatus for removing particulates and/or other undesirable components from a gas stream such as an exhaust gas stream.

There are many instances when it is desirable to remove particulates from a particulate-containing gas stream. For example in many industrial processes it is desirable for gases to be cleaned of particulates before undergoing eg. chemical or physical processing.

Another instance where it is desirable to remove particulates is in the field of vacuum cleaners. Although conventional filtration techniques are capable of removing comparatively coarse dust particles from the air flowing through a vacuum cleaner, such techniques are poor at removing fine particulates, which tend to cause various ailments, including respiratory disorders, if allowed to exhaust from a vacuum cleaner into the ambient air of a room.

Another field in which particulate removal is particularly important is that of diesel engine exhausts.

Diesel engines are widely used throughout the world, particularly in heavy vehicles (trucks, buses and trains) and increasingly in automobiles. They are robust, fuel-efficient, long-lasting, and emit relatively low levels of carbon monoxides but they suffer from two major disadvantages which are causing increasing environmental concern. These are: (a) the emission of particulates, and (b) the emission of undesirable components such as oxides of nitrogen, sulphur and/or polynuclear hydrocarbons.

The particulates, which are carbonaceous in nature, are associated with undesirable hydrocarbons, of which the class known as polycyclic aromatic hydrocarbons are of particular concern. One of these compounds, 3-nitrobenzanthrone, has been reported (Suzuki et al, Environment Science and Technology, Volume 3, page 2772, 1997) as being extremely active in causing mutations in the DNA of standard strains of bacteria, as measured by the so-called Ames Test. Other compounds also present in diesel exhaust gases, such as 1,8-dinitropyrene, have also been found to be strongly mutagenic. These observations point to a strong link between diesel exhaust emissions and carcinogens in the atmosphere. It has been estimated that the tiny combustion particles, especially those with dimensions of less than 1 micrometre, are capable of carrying these chemicals into the deep recesses of human lungs. Virtually all diesel particles are in this size range (Michael P. Walsh "Global Trends in Diesel Emission Control—1 1997 Update", SAE Technical Series Paper 970179). Particulates from diesel exhaust gases may cause 10,000 deaths in Britain and 60,000 deaths in the USA each year. ("Dying from too much dust", New Scientist, Mar. 12, 1994, page 12). This leads to the conclusion of J. Merefield and I. Stone (New Scientist, Sep. 20, 1997, page 58) that "we could greatly improve our health and the urban air if we had better control over our vehicles' exhausts".

Oxides of nitrogen (and ozone) are also very undesirable atmospheric pollutants because they generate oxygen radicals, which can damage DNA and attack cell membranes. Nitrogen dioxide, $NO_2$, emitted from diesel engines is capable of producing oxygen atoms under the influence of sunlight, i.e.:

$$sunlight + NO_2 \rightarrow NO + O.$$

These oxygen atoms can then combine with oxygen in the atmosphere to form ozone, $O_3$, i.e.:

$$O + O_2 \rightarrow O_3.$$

This explains why ozone pollution is especially serious during warm, sunny days. It should be noted also that ozone is harmful not only to humans in a number of ways (damage to airways linings, inflammatory reactions, and increased likelihood of asthma attacks), but also to vegetation, causing reduced yields from a range of crops including wheat, barley and peas.

Naturally, because of the worldwide concerns for these problems, there has been a great deal of effort directed towards finding a solution. The most obvious of these, designed to remove particulates, makes use of filters or traps. The main problem with these is that they tend to become blocked, which results in numerous inefficiencies in the operation of the engines to which they are attached. This technology has been studied extensively. (See, for example, Y. Teraoka et al., Catal. Today, Volume 27, page 107 (1996). It is possible to regenerate the filters by burning off the trapped soot, and this procedure is rendered more efficient if a catalyst is incorporated into the filter material (as referred to by J. P. A. Neeft et al. in Appl. Catal. B. Environmental, Volume 8, Page 57 (1996)). Naturally this constant need for removal and regeneration is a serious disadvantage. An alternative approach has been advocated by Cooper and Thoss (SAE Technical Paper 890404 (1989)). In this case a platinum-containing catalyst was mounted upstream of a particulate trap in order to oxidise nitrogen to nitrogen dioxide. The resulting $NO_2$ is a powerful oxidising agent which is capable of removing carbon, viz.,

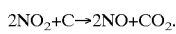

$$2NO_2 + C \rightarrow 2NO + CO_2.$$

Unfortunately, as this equation shows, the reaction generates nitric oxide. Furthermore, the catalyst is sensitive to poisoning by sulphur, which is present to a greater or lesser extent in diesel fuels throughout the world.

Therefore it is clear that there is a need for a system which is capable of removing particulates efficiently (especially those smaller than 1 $\mu m$) and which is unaffected by the presence of sulphur.

U.S. Pat. No. 5,453,107 and U.S. Pat. No. 3,803,813 disclose apparatus for filtering particulates from exhaust and other gases wherein the gas is first bubbled through a liquid prior to passing through a filter.

U.S. Pat. No. 5,129,926 describes an engine exhaust system comprising a water-filled scrubber tank through which the exhaust gas is released. The system further comprises a moisture trap for returning some of the condensed gas back to the inlet manifold of the engine and a filter to filter the gases once they have passed through the moisture trap.

U.S. Pat. No. 3,957,467 discloses an exhaust gas purifier and silencer in which exhaust gases are first released from a conduit into a liquid to purify the gas and thereafter returned to the same conduit and exhausted.

DETAILED DESCRIPTION OF THE INVENTION

According to a first aspect of the invention, there is provided a method of removing particulates and/or other undesirable components from a gas stream, comprising wetting at least a portion of the gas stream in order that the particulates and/or undesirable components are entrapped and/or dissolved in the liquid thereby cleaning the gas; and further comprising cooling the gas stream and/or cleaned gas to condense desired fractions thereof.

This method is advantageously simple, and inexpensive since it does not require the expensive metals usually needed in particulate removal systems that operate by catalysts. Also, the method of the invention has the capability of removing certain oxides of nitrogen and sulphur.

Desirable the majority or substantially all the gas stream is wetted.

It is to be understood that the term wetting includes both passing said at least a portion of the gas stream through a liquid, or merely blowing the gas stream onto the liquid in order to wet it.

Preferably the liquid is or is predominantly water, and more preferably includes a detergent. In preferred embodiments the detergent constitutes 1 part in 50,000 of the liquid.

The detergent ensures that the liquid wets the fine particulates, and has been found to be particularly effective when the gas stream is diesel exhaust gas.

However, nitric oxide is only sparingly soluble in water, thus a strong oxidising agent such as ozone may be provided in order to oxidise the nitric oxide to nitrogen dioxide. The ozone may also serve to oxidise any harmful polynuclear hydrocarbons to less harmful hydrocarbons.

Additionally, or alternatively the water may contain sodium carbonate in order to convert any sulphur present in the gas stream to sodium sulphate. The liquid may include antifreeze (eg. ethylene glycol). This makes the method of the invention more suitable for use in road vehicles used in cold climates.

In one arrangement the step of wetting the gas stream occurs in a container having a splash guard for minimising fragmentation and/or loss of the liquid from the container.

This feature of the inventive method advantageously prevents the liquid from being thrown outwardly of the container under the force of the gas stream.

Conveniently the step of wetting the gas occurs in a vessel having an outlet for cleaned gas, the method including the step of cooling the cleaned gas to condense desired fractions thereof. This step ensures that any of the liquid vaporised and conveyed to the outlet with the cleaned gas is condensed and thereby available for further use in the method of the invention. This feature is particularly advantageous when the method is used to clean diesel exhaust gases, that are usually at a high enough temperature when passed through the liquid to vaporise the latter. The condensing step avoids wastage of the liquid.

Typically the cooling takes place in the cleaned gas outlet. If the cleaned gas outlet is appropriately located, the condensed liquid may flow under gravity back to the main body of liquid in the container.

The splash guard (when present) also optionally cools the cleaned gas. This may be achieved eg. by manufacturing the splash guard from a material having a comparatively high thermal conductivity. Many metals are suitable.

Preferably the gas stream flows into the liquid via a submerged pipe having a plurality of apertures defining an aggregate area at least equal to the diameter of the pipe This feature ensures that the method does not cause serious back pressure.

Alternatively the gas stream may be blown onto the surface of the liquid via a pipe. The pipe may be positioned in the container so as to induce mixing or swirling of the liquid on blowing of the gas stream onto the surface of the liquid. This can serve to ensure adequate wetting of the gas stream.

In turn this means that the method is useable to clean the exhausts of internal combustion engines, since the method can be practiced without significantly affecting the engine exhaust back pressure.

Preferably the gas stream is or includes exhaust gas from an internal combustion engine, particularly a compression ignition engine. The method of the invention may also be practiced on other gas streams, including but not limited to those mentioned herein.

The method may optionally include filtering of the liquid. This may allow a quantity of the liquid to be used several times. The invention may include the step of further passing a gas stream through the filtered liquid.

According to a second aspect of the invention, there is provided an apparatus for removing particulates and/or other undesirable components from a gas stream, comprising: a container containing a liquid; an inlet for the gas stream permitting wetting of at least a portion of the gas stream; and an outlet from the container for cleaned gas wherein the inlet and/or outlet includes condensing means for cooling and condensing desired fractions of the gas stream and/or cleaned gas. This apparatus advantageously permits practising of the method of the invention.

Conveniently the inlet for the gas stream includes a pipe, connected to a source of the gas stream, at least partially submerged in the liquid and including one or more apertures or perforations permitting passage of the gas stream through the liquid. Preferably the aggregate surface area defined by the apertures in the pipe generally equals the transverse cross-sectional area of the pipe. These features ensure that the apparatus of the invention does not adversely influence the pressure of the gas stream being supplied to it.

Alternatively the inlet for the gas stream includes a pipe, connected to a source of the gas stream, arranged so as to enable the gas stream to be blown onto the surface of the liquid.

Typically the liquid is or is predominantly water, particularly water and a detergent approximately in the ratio 1 part detergent to 50,000 parts water. The liquid may also include an antifreeze. The key features of the liquid are that it adequately wets the particulates; and that it does not react undesirably with the gas. Thus any of a range of liquids may be suitable. For example the liquid may include an oxidising agent and/or a carbonate, such as sodium carbonate in order to assist with the removal of undesirable components such as nitric oxide and/or sulphur from the gas stream. A suitable oxidising agent is ozone. Thus, in a preferred embodiment the apparatus of the invention further comprises an ozone generator for providing ozone to the container. Preferably at least a portion of the ozone is passed into the liquid.

In some instances it may not be desirable to include antifreeze in the liquid, for example to minimise cost. In such circumstances it is desirable for the pipe to comprise further perforations which extend above the surface of the liquid. Thus, should the liquid freeze, the gas can still escape from the pipe by way of the perforations above the frozen liquid surface. Once the liquid defrosts, the majority of the gas stream will pass through the liquid.

These features assist in practising of the method of the invention.

Conveniently the apparatus includes a splash guard for minimising fragmentation and/or loss of the liquid from the container. The function of this is described above.

In preferred embodiments the splash guard includes a perforated plate, especially one having plural perforations, covering or substantially covering the surface of the liquid. Conveniently the splash guard includes a wire mesh overlying the surface of the liquid. In practical embodiments the wire mesh overlies, and covers, the perforated plate.

This design of splash guard has been found to be particularly effective in limiting fragmentation (splashing) of a foaming liquid such as a water and detergent mix. If the splash guard (or part thereof) is manufactured from a material, such as a metal, having good thermal conductivity, the splash guard advantageously serves to cool any liquid splashing onto it and any gas passing through it. This tends to condense any of the liquid vaporised by heat in the gas stream. The condensed liquid falls into the main body of liquid via the perforations, and is thus made available for re-use.

Conveniently the outlet for cleaned gas includes a pipe containing a wire mesh. The wire mesh in the pipe also serves to cool and condense vaporised liquid. If the location of the pipe is correctly chosen the thus condensed liquid flows back to the main body thereof and is available for re-use.

Conveniently the apparatus includes a cooler for the outlet for cleaned gas. Preferably the cooler is or includes one or more cooling pipes surrounding or within the outlet and having flowing therein a cold fluid. The cooler assists in the condensation of the cleaned gas which may comprise vaporised liquid and thus helps to minimise evaporation of the liquid from the container.

The apparatus optionally includes for filtering of particulates from the liquid. Conveniently the container includes one or more apertures for filling it with and emptying it of the liquid, thereby permitting use of the filter remotely of the container and return of the filtered liquid to the container. These features allow the liquid to be re-used several times.

In a preferred embodiment the apparatus includes a particulate detecting device, operatively connected to monitoring apparatus, in the outlet for cleaned gas. This feature permits monitoring of the cleaned gas output, and if necessary can be used to indicate when filtering of the liquid is needed.

The dependent claims hereof set out further, optional features of the invention.

There now follows a description of preferred embodiments of the invention, by way of example, with reference being made to the accompanying drawings in which.

Figure 1:
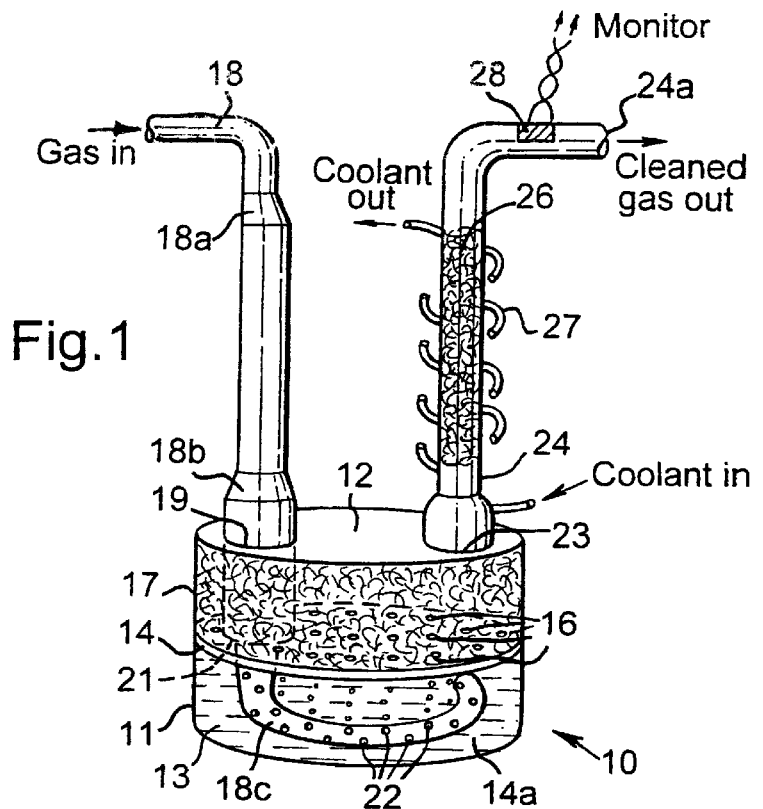
FIG. 1 is a schematic view of a first embodiment of apparatus and a method according to the invention.

FIG. 1 shows an apparatus 10 according to the invention comprising a generally cylindrical container 11 having an open upper end that is sealingly closed by a lid 12.

Container 11 contains a liquid 13 that is, essentially, a 1:50,000 (or other ratio) mix of a liquid detergent (ie. ARIEL FUTURE® manufactured by Procter & Gamble and water in the embodiment shown. Other detergents may of course be used, in which case the ratio of detergent to water may require adjustment. It is essential only that the liquid 13 is capable of wetting the fine particulates (eg. those of a diameter less than 0.1 $\mu$m) described herein. The detergent/water mixture has been found to be highly successful in this regard.

Liquid 13 may also contain an antifreeze, thereby permitting use of the apparatus over a wide range of ambient temperatures, including sub-zero temperatures.

The liquid 13 resides in approximately the lower half of container 11. A circular plate 14, of approximately the same diameter as container 11 and having formed therein a plurality of generally regularly spaced apertures 16 overlies the liquid 13.

Plate 14 may be supported by brackets or an equivalent support (not visible in FIG. 1) that secure it within container 11.

Typically the plate 14 is formed from a metal such as stainless steel (or alloys including such metals). This confers on the plate 14 the thermal conductivity discussed herein.

Overlying plate 14 is a layer 17 of woven, knitted or otherwise mingled wire strands defining a mesh. Preferably the wire strands are of stainless steel or aluminum containing ferritic steel; or other materials (including non-metals) capable of withstanding conditions within container 11.

An inlet pipe 18 for a particulate-containing gas stream is connected to eg. the exhaust manifold of a diesel engine, an item of process plant or a vacuum cleaner, whereby a stream of particulate-containing gas (signified by "Gas In" in FIG. 1) may be fed to the interior of container 11.

In the embodiment shown, pipe 18 optionally enlarges in diameter in two locations, visible at 18a and 18b, near lid 12.

This is because the embodiment of FIG. 1 is intended for attachment to the exhaust outlet of a diesel engine. It is important that the apparatus 10 does not induce undesirable back pressures into the exhaust tract of the engine.

Pipe 18 passes downwardly, via an aperture 19, through lid 12. Pipe 18 is a sealing fit in aperture 19.

From aperture 19, pipe 18 passes downwardly through a substantially cylindrical space in layer 17 and through a further aperture 21 formed in plate 14. It is not essential for aperture 21 to seal about pipe 18.

Below plate 14 pipe 18 is reduced diameter (signified by numeral 18c) and terminates in a curved portion located on or adjacent to the base 14a of container 11. The curvature of portion 18c generally follows that of the wall of container 11. Portion 18c has formed therein and distributed along its length a plurality of apertures 22 that allow egress of the particulate-containing gas from pipe portion 18c into the liquid 13 in which portion 18c is submerged.

In the embodiment shown, the pipe portion 18c is manufactured from a flexible material although this need not necessarily be so.

On its side opposite aperture 19 lid 12 includes a further, through-going aperture 23 that is sealingly secured about a cleaned gas outlet pipe 24. Outlet pipe 24 terminates above the surface of liquid 13 so that any gas under pressure in the upper half of container 11 passes into outlet pipe 24.

A length of pipe 24 is partially filled with a further quantity 26 of mingled, preferably stainless steel, wire strands in a mesh. Mesh 26 may also be of any other material (including non-metals), in a similar way to mesh 17. Preferably the meshes 17 and 26 are irregular.

An optional feature of the apparatus 10 is a coil or other arrangement of cooling pipes 27 that may encircle, be embedded in the walls of or may lie within pipe 24 for the purpose of cooling the mesh 26 and any gas in pipe 24. This is achieved by circulating a coolant such as water (preferably cold water) in the pipe(s) 27, eg. by means of a per se known coolant pump circuit of which the pipe(s) 27 form a part. If desired the temperature in pipe 24 may be controlled by eg. a feedback-type control for the coolant pump.

Cleaned, cooled gas (indicated in FIG. 1 by "Cleaned gas out") typically exhausts to atmosphere from the open end 24a of pipe 24. However, if the apparatus 10 is used for cleaning gases for use in process equipment, pipe 24 may of course be connected to other apparatuses as necessary.

Optionally pipe 24 may include therein, downstream of mesh 26, a device 28 capable of detecting fine particulates in the gas emerging via the pipe 24. The device may be connected to an apparatus (eg. containing a microprocessor), for monitoring the cleanliness of the gas in pipe 24. Such optional features of the invention may be used eg. to warn users of the need to filter the liquid 13 when it reaches its particulate-bearing limit, or replace with fresh liquid.

The container 11 may as shown be formed partly or wholly of a transparent or translucent material such as glass or some polymeric materials. This allows visual inspection of the condition of the liquid, which tends to darken as more and more particulates become entrained in it.

Figure 2:
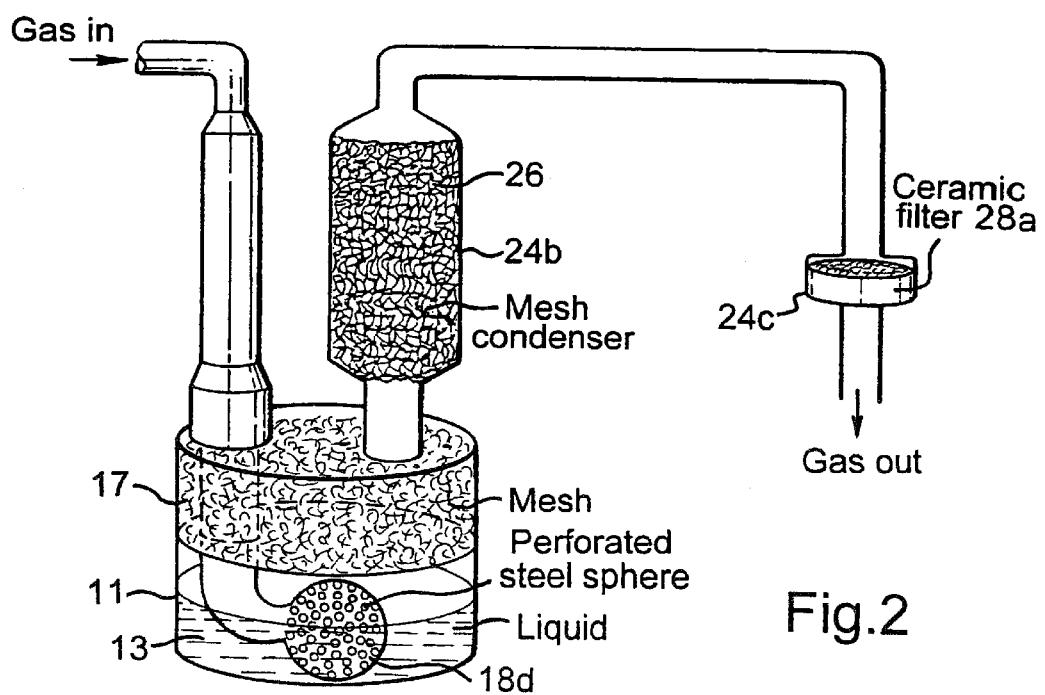
FIG. 2 is a schematic view of a second embodiment of apparatus according to the invention.

FIG. 2 shows a second embodiment of the invention including several optional modifications. The optional modifications may be employed alone, or in combination with one another. The mesh 17 may be supported above the liquid in the FIG. 2 embodiment.

In the FIG. 2 embodiment the perforated portion 18d of pipe 18 is spheroidal in shape, with the perforations spaced all around the sphere. This maximises contact of the gas with the liquid.

As shown in FIG. 2, the spheroidal portion 18d does not have to be completely submerged in the liquid 13. This permits a gas flow even if the liquid 13 freezes.

In the FIG. 2 embodiment the cooling pipes 27 optionally are dispensed with. Instead the outlet pipe 24 may include an enlarged diameter portion 24b containing a comparatively large amount of mesh material 26 as aforesaid, that is thermally conductive. This mesh acts to condense the exiting gas stream. This arrangement may obviate the need for a cooling liquid.

Outlet pipe 24 includes a second, enlarged diameter portion 24c that encloses and supports a ceramic filter 28a. The condition (ie. cleanliness) of the filter may be used to indicate any need for filtering of the liquid 13.

Another optional feature of the invention, not visible in FIGS. 1 and 2, is for the container 11 to be substantially hemispherical. This leads to spiralling of the gas flows in the same direction in the liquid, at a rate of spiralling generally proportional to engine speed.

This phenomenon gives rise to good flow characteristics in the liquid 13. It also permits the generation of a large number of smaller gas bubbles in the liquid, thereby improving mixing of the gas and liquid. Also, a hemispherical chamber 11 that is approximately half full of liquid 13 permits displacement of liquid 13, giving rise to good mixing.

Figure 3:
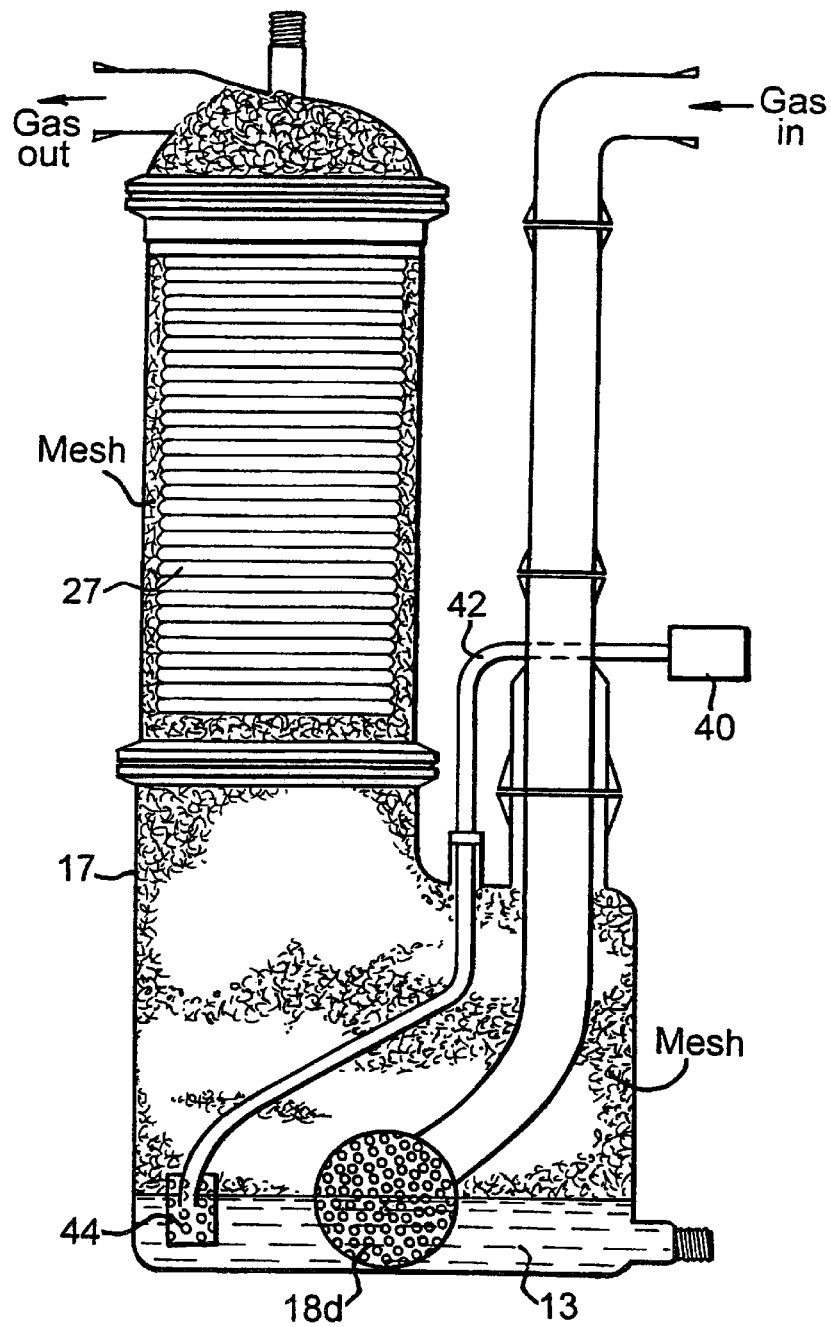
FIG. 3 is a schematic view of a third embodiment of apparatus according to the invention.

FIG. 3 shows a third embodiment of the invention including further modifications. The optional modifications may be employed alone, or in combination with one another.

The apparatus shown in FIG. 3 further includes an ozone generator 40 as supplied for example by ozone systems, St. Helens Merseyside England. Typically such an ozone generator may generate at least 1 g/hr of ozone. Ozone generated by the generator 40 passes along pipe 42 and into the liquid 13 through a perforated end piece 44.

There now follows a description of experimental operation of the apparatus 10 (FIG. 1) when connected to the exhaust tract of a diesel engine.

Hot exhaust gas from the engine passes into the liquid 13 via pipe 18 and aperture 22. Pipe portion 18c has a large number of small apertures 22, such that the total area of the apertures 22 is at least equal to the cross-sectional area of the incoming part of pipe 18, thereby minimising back-pressure. The exhaust gas emerges through these apertures 22 in the form of a large number of small jets, thereby ensuring good interaction between the gas and the liquid 13. The splash guard comprising plate 14 and mesh 17 prevents splashing of liquid 13 and causes any vapour components thereof to condense back to liquid. Mesh 26 situated in the outlet pipe 24 performs a similar function.

As previously noted the preferred liquid 13 in the container 11 is water. However it was initially observed that if pure water is used then particulates begin to accumulate gradually in the outlet tube 24. This effect is prevented by adding a very small concentration of detergent to the water, ie. typically 1 part detergent in 50,000 parts of water when the detergent is "Ariel Futur" RTM.

When it was required for the apparatus 10 to operate efficiently also in sub-zero temperatures, a liquid containing a 1:1 mixture of water and antifreeze was used. This was found to operate satisfactorily.

Figure 4:
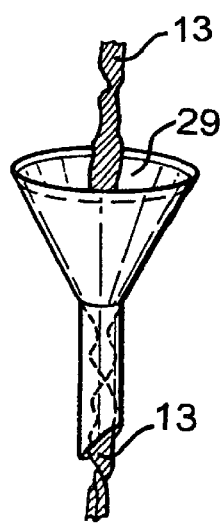
FIG. 4 shows filtering of liquid after use of the apparatus of FIGS. 1, 2 or 3.

The efficiency of the apparatus 10 for removing particulates was tested on a single cylinder diesel engine (Lister FR1, 800 cc) mounted on a test bed and coupled to a dynamometer to enable it to be run under varying loads. A filter 28a (FIG. 2) in the form of a ceramic monolith (10 mm dia.×2 mm thickness) containing a multitude of channels was mounted downstream to capture a sample of any particulates. It was found that in the absence of the apparatus 19 it quickly became coated with black particulates, whereas in the presence of the apparatus 10 it remained perfectly clean. It was found also that after running the engine for several hours, by which time the liquid had become black, the liquid could be filtered through a conventional filter paper 29 (FIG. 4) remote from the apparatus 10 which collected the carbonaceous material. The liquid emerging from the filter was quite clear, and could be re-used.

Another advantage of this liquid-based system is its potential for removing oxides of nitrogen and sulphur. Both $N_2O$ and $NO_2$ are soluble in water. NO, although only slightly soluble, can be oxidised for example by ozone to water-soluble $NO_2$. Similarly, $SO_2$ can be removed by dissolving in the water.

This represents an advantage over those catalytic systems which are liable to poisoning by sulphur-containing fuels.

It is understood that in the embodiments shown in FIGS. 2 and 3 portion of the gas stream does not pass into the liquid. Nevertheless, the gas passing out of the apparatus is found to be extremely clean. Without wishing to be bound by any particular theory it is thought that the particulates not passing into the liquid may be initially trapped by the wire mesh. Liquid which evaporates is in turn condensed by the cooling tubing and/or wire mesh. The condensed liquid then serves to wash the wire mesh removing the entrapped particles. Additionally or alternatively it is thought that due to the blowing action of the gas stream that a film of liquid forms on the inside surface of the sphere which ensures wetting of the portion of the gas not passing through the liquid.

In an embodiment of the present invention where the container is generally cylindrical in shape and a pipe is used to blow the gas stream onto the surface of the liquid it has been advantageously found that the end of the pipe, from which the gas stream is blown, may be directed onto the surface of the liquid towards the inside wall of the container. This induces a mixing or swirling of the liquid which serves to improve the wetting of the gas stream.

What is claimed is:

1. A method of removing particulates and/or other undesirable components from a an exhaust gas stream, comprising wetting by a liquid at least a portion of the exhaust gas stream by blowing the exhaust gas stream onto a surface of the liquid in a container having a splash guard for minimising loss of the liquid from the container in order that the particulates and/or undesirable components are entrapped and/or dissolved in the liquid thereby cleaning the exhaust gas; and further comprising cooling the exhaust gas stream and/or cleaned exhaust gas to condense desired fractions thereof.

2. A method according to claim 1 wherein the liquid is or is predominantly water.

3. A method according to claim 1 wherein the liquid includes a detergent.

4. A method according to claim 3 wherein the detergent constitutes approximately 1 part in 50,000 of the liquid.

5. A method according to claim 1 wherein the liquid includes antifreeze.

6. A method according to claim 5 wherein the step of cooling takes place in an outlet for cleaned exhaust gas.

7. A method according to claim 1 wherein the splash guard cools the cleaned exhaust gas.

8. A method according to claim 1 wherein the exhaust gas stream is or includes exhaust gas from an internal combustion engine.

9. A method according to claim 8 wherein the exhaust gas is from a compression ignition engine.

10. A method according to claim 1 comprising the further step of filtering the liquid to remove the particulates therefrom.

11. A method according to claim 10 including the further step of further passing a gas stream through the filtered liquid.

12. An apparatus for removing particulates and/or undesirable components from a gas stream, comprising a container suitable for containing a liquid; an inlet for the gas stream permitting wetting of at least a portion of the gas stream; a splash guard for minimising loss of the liquid from the container and an outlet from the container for cleaned gas wherein the inlet and/or outlet includes cooling means for condensing desired fractions of the gas stream, and/or cleaned gas.

13. An apparatus according to claim 12 wherein the liquid is or is predominantly water.

14. An apparatus according to claim 12 wherein the liquid includes a detergent.

15. An apparatus according to claim 12 wherein the detergent constitutes approximately 1 part in 50,000 of the liquid.

16. An apparatus according to claim 12 wherein the liquid includes an antifreeze.

17. An apparatus according to claim 12 wherein the splash guard includes a perforated plate covering or substantially covering the surface of the liquid.

18. An apparatus according to claim 17 wherein the plate includes plural perforations.

19. An apparatus according to claim 18 including a wire mesh overlying the surface of the liquid.

20. An apparatus according to claim 19 wherein the wire mesh overlies the perforated plate.

21. An apparatus according to claim 12 wherein the outlet for cleaned gas includes a pipe containing a wire mesh.

22. An apparatus according to claim 12 including a cooler for the outlet for cleaned gas.

23. An apparatus according to claim 22 wherein the cooler is or includes one or more cooling pipes surrounding or within the outlet and having flowing therein a cold fluid.

24. An apparatus according to claim 22 wherein the cooler includes a mesh of thermally conducting material in the outlet, for condensing gas in the outlet.

25. An apparatus according to claim 12 wherein the inlet for the gas stream includes a pipe, connected to a source of the gas stream, at least partially submerged in the liquid and including one or more apertures permitting passage of the gas stream through the liquid.

26. An apparatus according to claim 25 wherein the aggregate surface area defined by the apertures in the pipe generally are equal to or greater than the transverse cross-sectional area of the pipe.

27. An apparatus according to claim 26 wherein the area comprising the apertures is generally spheroidal in shape.

28. An apparatus according to claim 12 wherein the inlet for the gas stream includes a pipe arranged such that the gas stream is blown onto the surface of the liquid.

29. An apparatus according to claim 13 including a filter for filtering of particulates from the liquid.

30. An apparatus according to claim 29 wherein the container includes one or more apertures for filling it with and emptying it of the liquid, thereby permitting use of the filter remotely of the container and return of the filtered liquid to the container.

31. An apparatus according to claim 12 including a particulate detecting device, operatively connected to monitoring apparatus, in the outlet for cleaned gas.

32. An apparatus according to claim 12 including a filter in the outlet for cleaned gas.

33. An apparatus according to claim 32 wherein the filter is a ceramic filter.

34. An apparatus according to claim 12 wherein the container is generally hemispherical or spheroidal.

35. An apparatus according to claim 12 further comprising an ozone generator for providing ozone to the container in order to react with undesirable components of the gas stream to reduce or substantially eliminate said undesirable components from being passed out of the container with the cleaned gas.

36. An apparatus according to claim 35 wherein the undesirable components are selected from nitric oxide and/or polynuclear hydrocarbons.

* * * * *

UNITED STATES PATENT AND TRADEMARK OFFICE
CERTIFICATE OF CORRECTION

PATENT NO. : 6,626,983 B1
DATED : September 30, 2003
INVENTOR(S) : James Anthony Cairns It is certified that error appears in the above-identified patent and that said Letters Patent is hereby corrected as shown below:

Column 9,
Line 18, should read -- sirable components from an exhaust gas stream, compris- --

Signed and Sealed this

Second Day of March, 2004

JON W. DUDAS
*Acting Director of the United States Patent and Trademark Office*